(12) United States Patent
Ito

(10) Patent No.: US 9,065,373 B2
(45) Date of Patent: Jun. 23, 2015

(54) ROTATING ELECTRICAL MACHINE CONTROL APPARATUS

(75) Inventor: Yoshihiro Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 512 days.

(21) Appl. No.: 13/441,001

(22) Filed: Apr. 6, 2012

(65) Prior Publication Data
US 2012/0326650 A1    Dec. 27, 2012

(30) Foreign Application Priority Data

Jun. 24, 2011    (JP) ................ 2011-140373

(51) Int. Cl.
| | |
|---|---|
| H02P 1/04 | (2006.01) |
| H02P 29/00 | (2006.01) |
| B60K 6/46 | (2007.10) |
| B60W 20/00 | (2006.01) |
| B60W 30/184 | (2012.01) |
| B60L 3/00 | (2006.01) |
| B60L 7/14 | (2006.01) |
| B60L 11/12 | (2006.01) |
| B60L 11/18 | (2006.01) |

(52) U.S. Cl.
CPC ......... *H02P 29/0044* (2013.01); *Y02T 10/7077* (2013.01); *Y02T 10/6217* (2013.01); *B60K 6/46* (2013.01); *B60W 20/00* (2013.01); *B60W 30/1843* (2013.01); *B60W 2510/087* (2013.01); *B60L 3/0061* (2013.01); *B60L 7/14* (2013.01); *B60L 11/126* (2013.01); *B60L 11/1861* (2013.01); *B60L 2210/10* (2013.01); *B60L 2210/40* (2013.01); *B60L 2240/36* (2013.01); *B60L 2240/421* (2013.01); *B60L 2240/423* (2013.01); *B60L 2240/425* (2013.01); *B60L 2240/427* (2013.01); *B60L 2240/80* (2013.01); *B60L 2250/26* (2013.01); *Y02T 10/7044* (2013.01); *Y02T 10/7005* (2013.01); *Y02T 10/705* (2013.01); *Y02T 10/7241* (2013.01); *Y02T 10/7216* (2013.01); *Y02T 10/648* (2013.01)

(58) Field of Classification Search
USPC ............ 318/471, 473, 479, 400.26, 705, 708, 318/722, 724
See application file for complete search history.

(56) References Cited

U.S. PATENT DOCUMENTS

| | | | | |
|---|---|---|---|---|
| 6,992,452 | B1 * | 1/2006 | Sachs et al. .................... | 318/434 |
| 7,615,948 | B2 * | 11/2009 | Atarashi et al. ........... | 318/400.09 |
| 7,615,951 | B2 * | 11/2009 | Son et al. ....................... | 318/432 |
| 8,004,220 | B2 * | 8/2011 | Sparey et al. ............. | 318/400.22 |

(Continued)

FOREIGN PATENT DOCUMENTS

JP    2008-206339    9/2008

*Primary Examiner* — Bentsu Ro
*Assistant Examiner* — Thai Dinh
(74) *Attorney, Agent, or Firm* — Mori & Ward, LLP

(57) ABSTRACT

A rotating electrical machine control apparatus includes a plurality of rotating electrical machine controllers and a target voltage setting device. Each of the rotating electrical machine controllers includes a rotating electrical machine and a power supply controller configured to perform power supply control on the rotating electrical machine. The rotating electrical machine controllers have different imposed loads. The target voltage setting device is configured to set DC-side voltages of the rotating electrical machine controllers to a target voltage defined as a thermal equilibrium voltage which represents the DC-side voltages obtained when the rotating electrical machine controllers are in a thermal equilibrium condition.

5 Claims, 7 Drawing Sheets

(56) References Cited

U.S. PATENT DOCUMENTS

| | | | |
|---|---|---|---|
| 8,421,391 B2* | 4/2013 | Yeh et al. | 318/432 |
| 8,487,575 B2* | 7/2013 | Yeh et al. | 318/471 |
| 8,565,954 B2* | 10/2013 | Yeh et al. | 701/22 |
| 2005/0204761 A1* | 9/2005 | Karikomi et al. | 62/228.1 |
| 2007/0290633 A1* | 12/2007 | Atarashi et al. | 318/66 |
| 2008/0196962 A1* | 8/2008 | Capito | 180/249 |
| 2009/0125173 A1* | 5/2009 | Komatsu et al. | 701/22 |

* cited by examiner

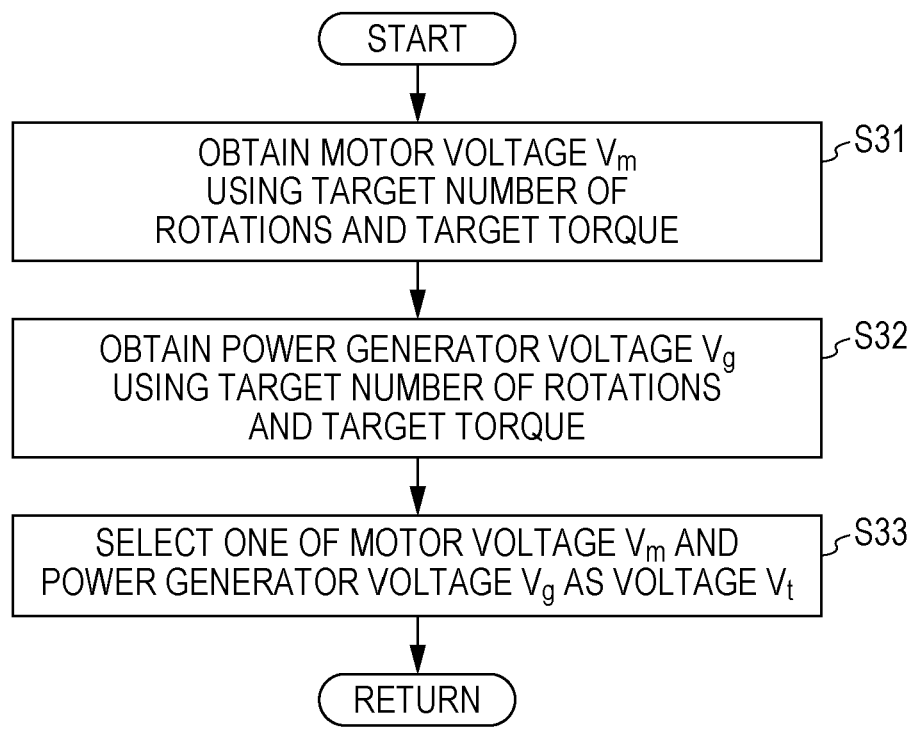

ROTATING ELECTRICAL MACHINE CONTROL APPARATUS

CROSS-REFERENCE TO RELATED APPLICATIONS

The present application claims priority under 35 U.S.C. §119 to Japanese Patent Application No. 2011-140373, filed Jun. 24, 2011, entitled "Rotating Electrical Machine Control Apparatus". The contents of this application are incorporated herein by reference in their entirety.

BACKGROUND OF THE INVENTION

1. Field of the Invention

The present technology relates to a rotating electrical machine control apparatus.

2. Discussion of the Background

For a series hybrid vehicle including a drive motor for driving a drive wheel of the vehicle, a power generation motor connected to an internal-combustion engine of the vehicle, a pulse-width modulation inverter for controlling each of the motors, and a step-up converter for stepping up a direct current (DC) voltage of a direct current power supply and supplying the direct current voltage to each of the motors, a rotating electrical machine control apparatus that performs a process of decreasing the magnet temperature on each of the motors by decreasing the voltage output from the step-up converter has been developed (refer to, for example, Japanese Unexamined Patent Application Publication No. 2008-206339).

SUMMARY OF THE INVENTION

According to one aspect of the present invention, a rotating electrical machine control apparatus includes a plurality of rotating electrical machine controllers and a target voltage setting device. Each of the rotating electrical machine controllers includes a rotating electrical machine and a power supply controller configured to perform power supply control on the rotating electrical machine. The rotating electrical machine controllers have different imposed loads. The target voltage setting device is configured to set DC-side voltages of the rotating electrical machine controllers to a target voltage defined as a thermal equilibrium voltage which represents the DC-side voltages obtained when the rotating electrical machine controllers are in a thermal equilibrium condition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 8 is a flowchart illustrating an exemplary operation of the rotating electrical machine control apparatus according to the modification of the exemplary embodiment.

DESCRIPTION OF THE EMBODIMENTS

Figure 1:
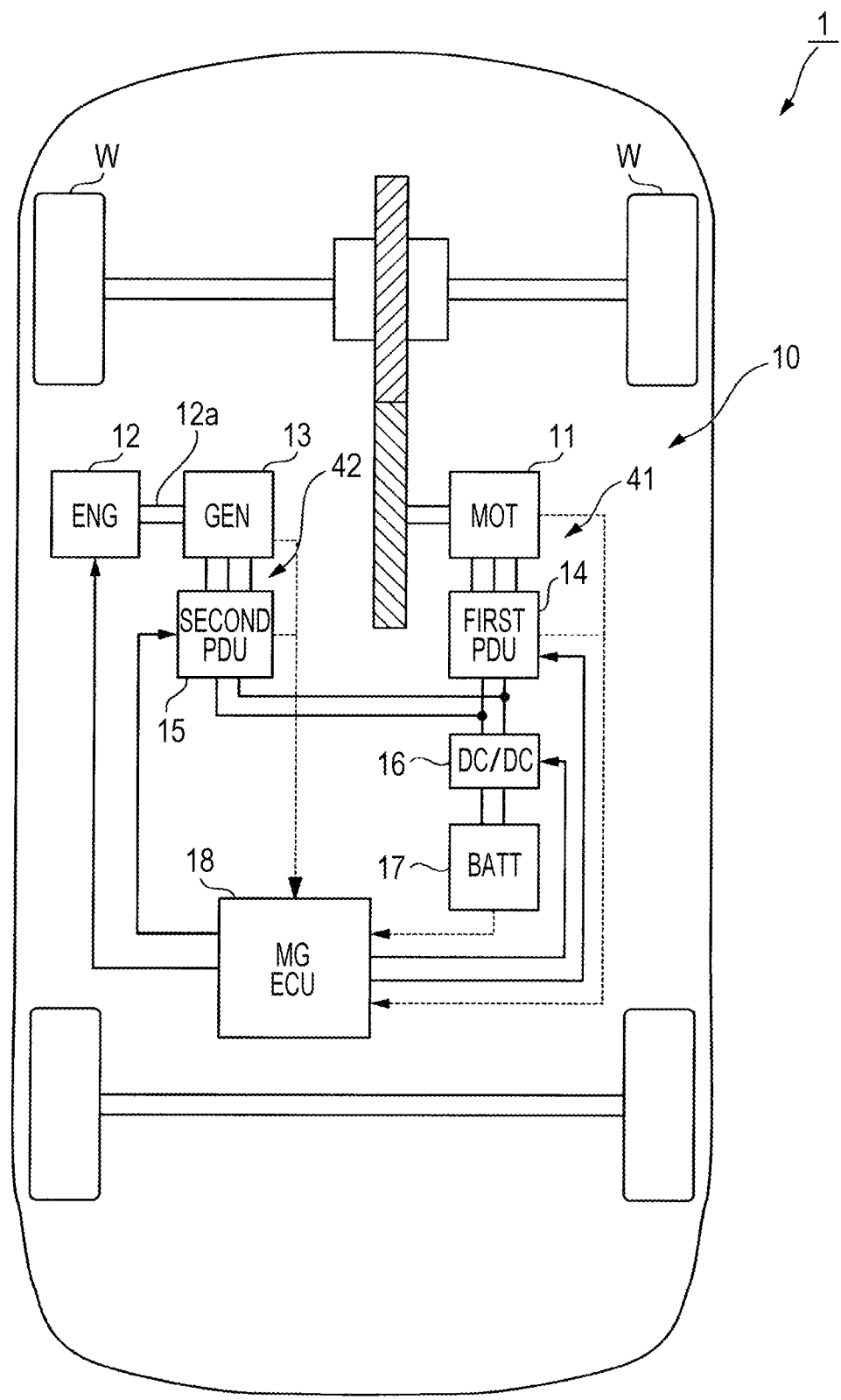
FIG. 1 illustrates an exemplary configuration of a rotating electrical machine control apparatus according to an exemplary embodiment.

The embodiments will now be described with reference to the accompanying drawings, wherein like reference numerals designate corresponding or identical elements throughout the various drawings.

A rotating electrical machine control apparatus 10 according to the present exemplary embodiment is mounted in, for example, a hybrid vehicle 1 illustrated in FIG. 1. The hybrid vehicle 1 is of a series type in which, for example, a drive motor (MOT) 11 for driving is connected to drive wheels W, and a power generation motor (GEN) 13 for power generation is connected to a crankshaft 12a of an internal-combustion engine (ENG) 12.

For example, three-phase DC brushless motors are used as the motors 11 and 13. The motors 11 and 13 are connected to first power drive unit (PDU) 14 and a second PDU 15 that control the motors 11 and 13, respectively. Each of the PDUs 14 and 15 includes a pulse-width modulation (PWM) inverter formed from a bridge circuit in which a plurality of switching elements, such as transistors, are bridge-connected.

The PDUs 14 and 15 are connected to a battery (BATT) 17 via, for example, a DC/DC converter 16. The DC/DC converter 16 can step up or step down the inter-terminal voltage of the battery (BATT) 17 to a predetermined voltage and apply the voltage to the PDUs 14 and 15. In addition, the DC/DC converter 16 can step up or step down the inter-terminal voltages of the PDUs 14 and 15 (the voltages on the DC side) to a predetermined voltage and recharge the battery 17.

When, for example, the drive motor 11 operates, the first PDU 14 converts the DC power supplied from one of the DC/DC converter 16 and the second PDU 15 of the power generation motor 13 into alternating-current (AC) power and supplies the AC power to the motor 11. In addition, when, for example, the power generation motor 13 generates electrical power using the power of the internal-combustion engine 12, the second PDU 15 converts AC power generated by and output from the power generation motor 13 into DC power and recharges the battery 17 via the DC/DC converter 16 or supplies the DC power to the first PDU 14 of the drive motor 11.

In addition, if a drive force is transferred from the drive wheels W to the drive motor 11 during, for example, deceleration of the hybrid vehicle 1, the drive motor 11 functions as an electric generator and generates a regenerative braking force. In this way, the kinetic energy of the vehicle is recovered in the form of electrical energy. When the drive motor 11 generates electric power, the first PDU 14 converts the generated (regenerative) AC power output from the drive motor 11 into DC power and recharges the battery 17 via the DC/DC converter 16.

The rotating electrical machine control apparatus 10 further includes, for example, an MGECU 18 that serves as an electronic control unit (ECU) formed from an electronic circuit, such as a central processing unit (CPU), and that performs overall control of the hybrid vehicle 1.

Figure 2:
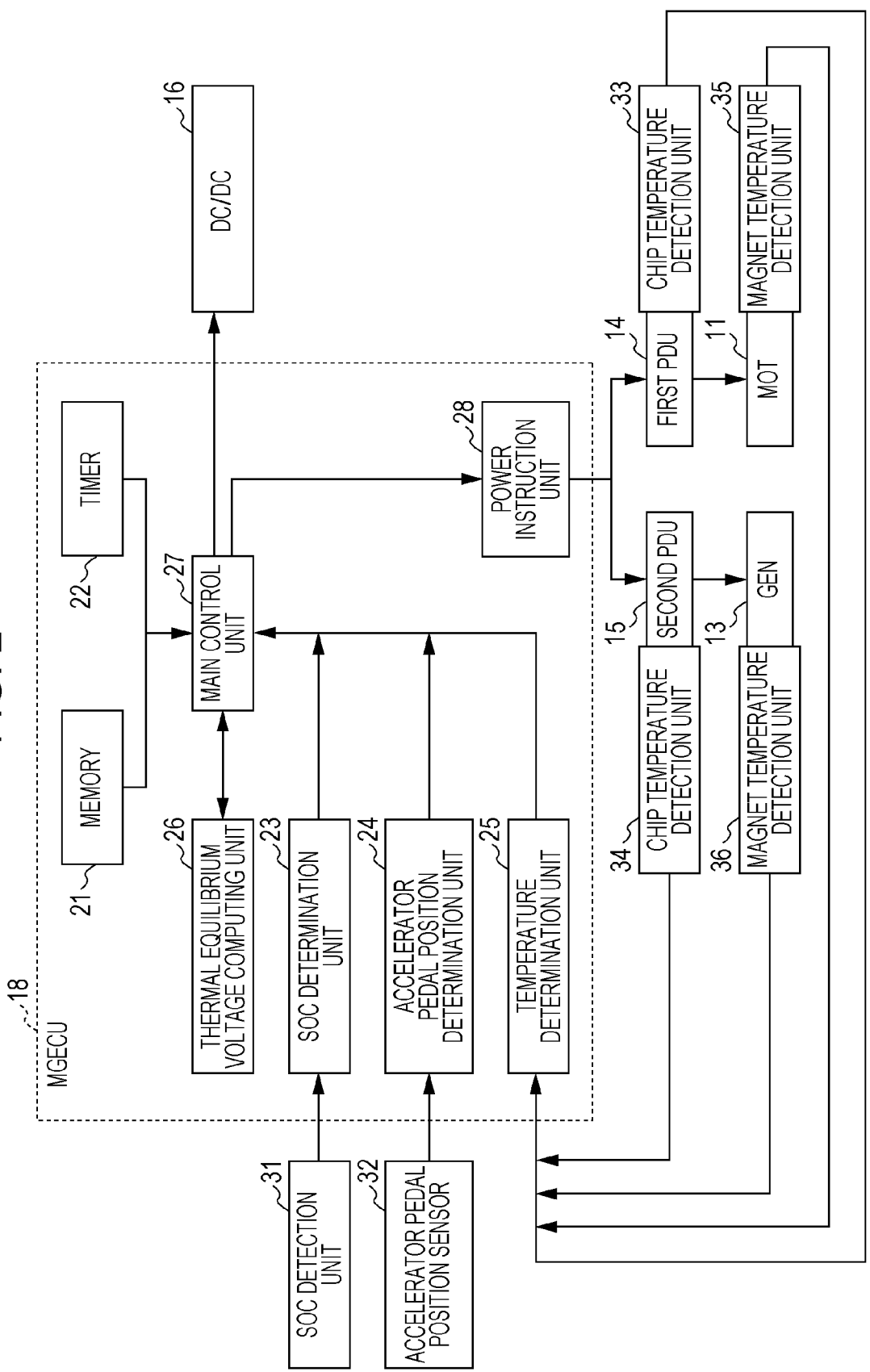
FIG. 2 illustrates an exemplary configuration of an MGECU of the rotating electrical machine control apparatus according to the exemplary embodiment.

For example, as illustrated in FIG. 2, the MGECU 18 includes a memory 21, a timer 22, a SOC determination unit 23, an accelerator pedal position determination unit 24, a temperature determination unit 25, a thermal equilibrium voltage computing unit 26, a main control unit 27, and a power instruction unit 28.

The SOC determination unit 23 acquires the amount of charge remaining in the battery 17 on the basis of a detection signal output from an SOC detection unit 31. The SOC detection unit 31 detects the amount of charge remaining in the battery 17 (e.g., a state of charge (SOC) indicating the ratio of a current amount of electricity (or a current amount of electric power) to the full capacity).

The accelerator pedal position determination unit 24 acquires an accelerator pedal position on the basis of a detection signal output from an accelerator pedal position sensor 32. The accelerator pedal position sensor 32 detects a stroke of an accelerator pedal changed by a driver of the hybrid vehicle 1 pressing the accelerator pedal (i.e., the accelerator pedal position).

The temperature determination unit 25 acquires the temperatures of chips, such as a PWM inverter chip (not illustrated), that form the first PDU 14 and the second PDU 15 and the temperatures of permanent magnets (not illustrated) of the motors 11 and 13 on the basis of detection signals output from the chip temperature detection units 33 and 34 and detection signals output from magnet temperature detection units 35 and 36. Note that instead of directly detecting the temperatures of the permanent magnets, the magnet temperature detection units 35 and 36 may acquire the temperatures of the permanent magnets by acquiring different temperature detection values and referring to a predefined map obtained through an experiment conducted in advance. Examples of such a map includes a map indicating a correspondence between the temperature of a cooling medium for each of the drive motors 11 and 13 and the temperature of the corresponding permanent magnet, and examples of the different temperature detection values include the results of detection of the temperatures of the cooling media for the motors 11 and 13.

Let $\Delta Tmot1$ denote a magnet temperature margin indicating a difference between a predetermined protection temperature and the temperature of the permanent magnet of the drive motor 11. Let $\Delta Tmot2$ denote a chip temperature margin indicating a difference between a predetermined protection temperature and the temperature of the first PDU 14. Let $\Delta Tmot$ denote a motor temperature margin indicating the sum of the magnet temperature margin $\Delta Tmot1$ and the chip temperature margin Tmot2.

In addition, let $\Delta Tgen1$ denote a magnet temperature margin indicating a difference between a predetermined protection temperature and the temperature of the permanent magnet of the power generation motor 13. Let $\Delta Tgen2$ denote a chip temperature margin indicating a difference between a predetermined protection temperature and the temperature of the second PDU 15. Let $\Delta Tgen$ denote a power generator temperature margin indicating the sum of the magnet temperature margin $\Delta Tgen1$ and the chip temperature margin $\Delta Tgen2$.

Figure 3:
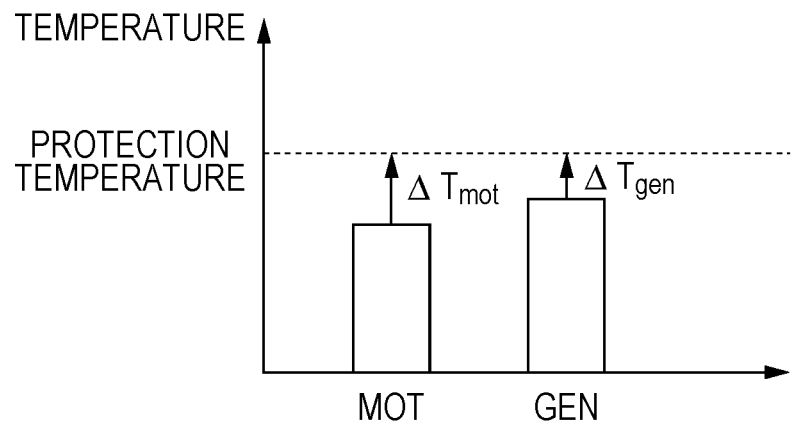
FIG. 3 illustrates an example of a protection temperature, a motor temperature margin, and a generator temperature margin of the rotating electrical machine control apparatus according to the exemplary embodiment.

Note that the predetermined protection temperatures for the motors 11 and 13 may differ from each other. The predetermined protection temperatures for the PDUs 14 and 15 may differ from each other. Alternatively, the predetermined protection temperatures for the motors 11 and 13 may be the same. The predetermined protection temperatures for the PDUs 14 and 15 may be the same. Still alternatively, for example, as illustrated in FIG. 3, the same protection temperature may be set for a combination of the drive motor 11 and the first PDU 14 (a rotating electrical machine control unit 41) and a combination of the power generation motor 13 and the second PDU 15 (a rotating electrical machine control unit 42).

The thermal equilibrium voltage computing unit 26 computes a thermal equilibrium voltage Vtar that represents the voltage of the PDUs 14 and 15 on the DC side (i.e., a secondary side voltage of the DC/DC converter 16) and that is obtained when the motors 11 and 13 and the PDUs 14 and 15 are in thermal equilibrium on the basis of a motor voltage Vmot of the drive motor 11, a power generator voltage Vgen of the power generation motor 13, the motor temperature margin $\Delta Tmot$, and the power generator temperature margin $\Delta Tgen$ computed by the main control unit 27 (described in more detail below).

For example, the thermal equilibrium voltage computing unit 26 computes the thermal equilibrium voltage Vtar using the following equation:

$$V_{tar} = \frac{V_{mot} \times \Delta T_{gen} + V_{gen} \times \Delta T_{mot}}{\Delta T_{mot} + \Delta T_{gen}} \qquad (1)$$

Figure 4:
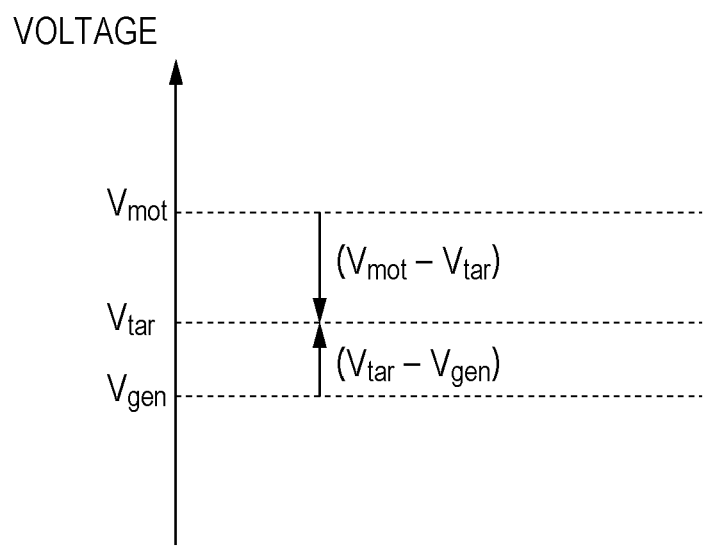
FIG. 4 illustrates an example of a thermal equilibrium voltage, a motor voltage, and a power generator voltage of the rotating electrical machine control apparatus according to the exemplary embodiment.

For example, equation (1) can be derived on the assumption that as illustrated in FIG. 4, the ratio of a voltage difference (Vmot−Vtar) between the motor voltage Vmot and the thermal equilibrium voltage Vtar to a voltage difference (Vtar−Vgen) between the thermal equilibrium voltage Vtar and the power generator voltage Vgen is equal to the ratio of the motor temperature margin $\Delta Tmot$ to the power generator temperature margin $\Delta Tgen$.

The main control unit 27 refers to a variety of data items stored in the memory 21 and the measured time output from the timer 22 and performs, for example, feedback control of an electrical current supplied to the motors 11 and 13 on the basis of the results of processing performed by the SOC determination unit 23, the accelerator pedal position determination unit 24, and the temperature determination unit 25. Thus, the main control unit 27 outputs an instruction signal that defines the operation of each of the motors 11 and 13.

In addition, the main control unit 27 computes the target numbers of rotations and the target torques of the motors 11 and 13 on the basis of the amount of charge remaining in the battery 17 (i.e., the SOC) acquired by the SOC determination unit 23 and the accelerator pedal position acquired by the accelerator pedal position determination unit 24. Thereafter, the main control unit 27 refers to predetermined maps stored in the memory 21. Examples of the predetermined maps include a map defining a correspondence between the number of rotations and torque of the drive motor 11 and a power supply voltage that minimizes an operating loss of the drive motor 11 (i.e., the minimum loss voltage on the DC side of the PDU 14) and a map defining a correspondence between the number of rotations and torque of the drive motor 13 and a power supply voltage that minimizes an operating loss of the drive motor 13 (i.e., the minimum loss voltage on the DC side of the PDU 15), that is, a drive motor minimum loss voltage map and a power generator minimum loss voltage map. Thus, the main control unit 27 obtains the power supply voltage (the minimum loss voltage) corresponding to the target numbers of rotations and the target torque of each of the motors 11 and 13. Thereafter, the main control unit 27 uses the obtained minimum loss voltages as the motor voltage Vmot for the drive motor 11 and the power generator voltage Vgen for the power generation motor 13.

Furthermore, the main control unit 27 sets a target voltage V for the voltage of each of the PDUs 14 and 15 on the DC side (i.e., the secondary side voltage of the DC/DC converter 16) using the thermal equilibrium voltage Vtar computed by the thermal equilibrium voltage computing unit 26. Thereafter, the main control unit 27 controls the electrical power conversion operations performed by the PDUs 14 and 15 and the DC/DC converter 16.

The power instruction unit 28 outputs control signals for controlling the electrical power conversion operations performed by the first PDU 14 and the second PDU 15 in response to an instruction signal output from the main control unit 27. In this way, the power instruction unit 28 controls the drive operation and the power generation operation performed by the drive motor 11. In addition, the power instruction unit 28 controls the power generation operation performed by the power generation motor 13 using the power of the internal-combustion engine 12.

According to the present exemplary embodiment, the rotating electrical machine control apparatus 10 has the above-described configuration. An exemplary operation performed by the rotating electrical machine control apparatus 10 and, in particular, an operation for setting the target voltage V is described next.

Figure 5:
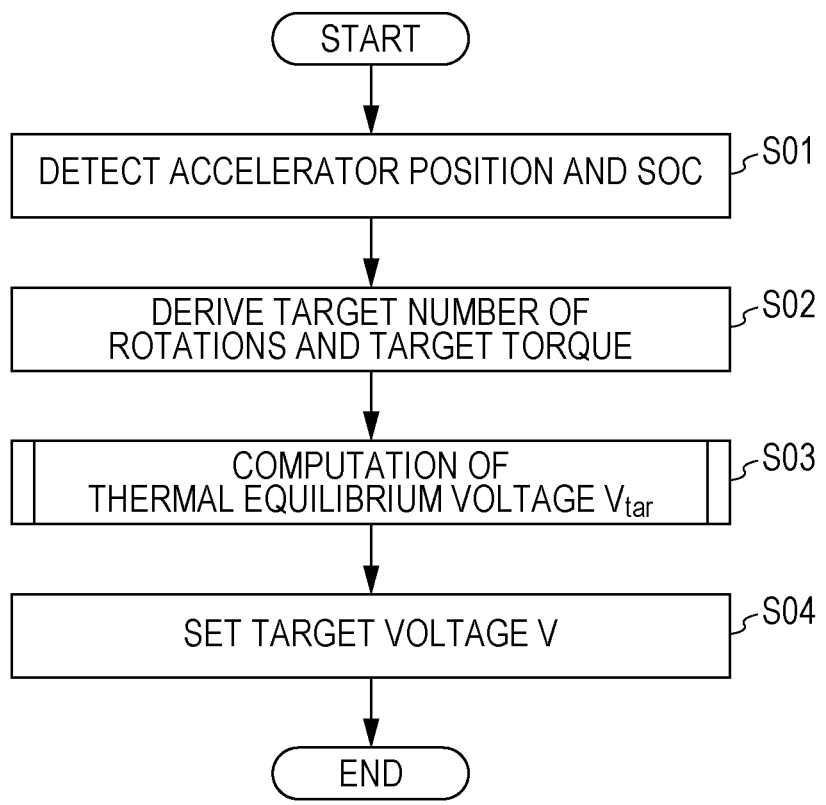
FIG. 5 is a flowchart illustrating an exemplary operation of the rotating electrical machine control apparatus according to the exemplary embodiment.

As illustrated in FIG. 5, in step S01, the accelerator pedal position and the amount of charge remaining in the battery 17 (the SOC) are detected. In step S02, the target number of rotations and the target torque are computed for each of the motors 11 and 13. In step S03, a computation process of the thermal equilibrium voltage Vtar (described in more detail below) is performed. Subsequently, in step S04, the target voltage V is set using the thermal equilibrium voltage Vtar. Thereafter, the processing proceeds to "END".

Figure 6:
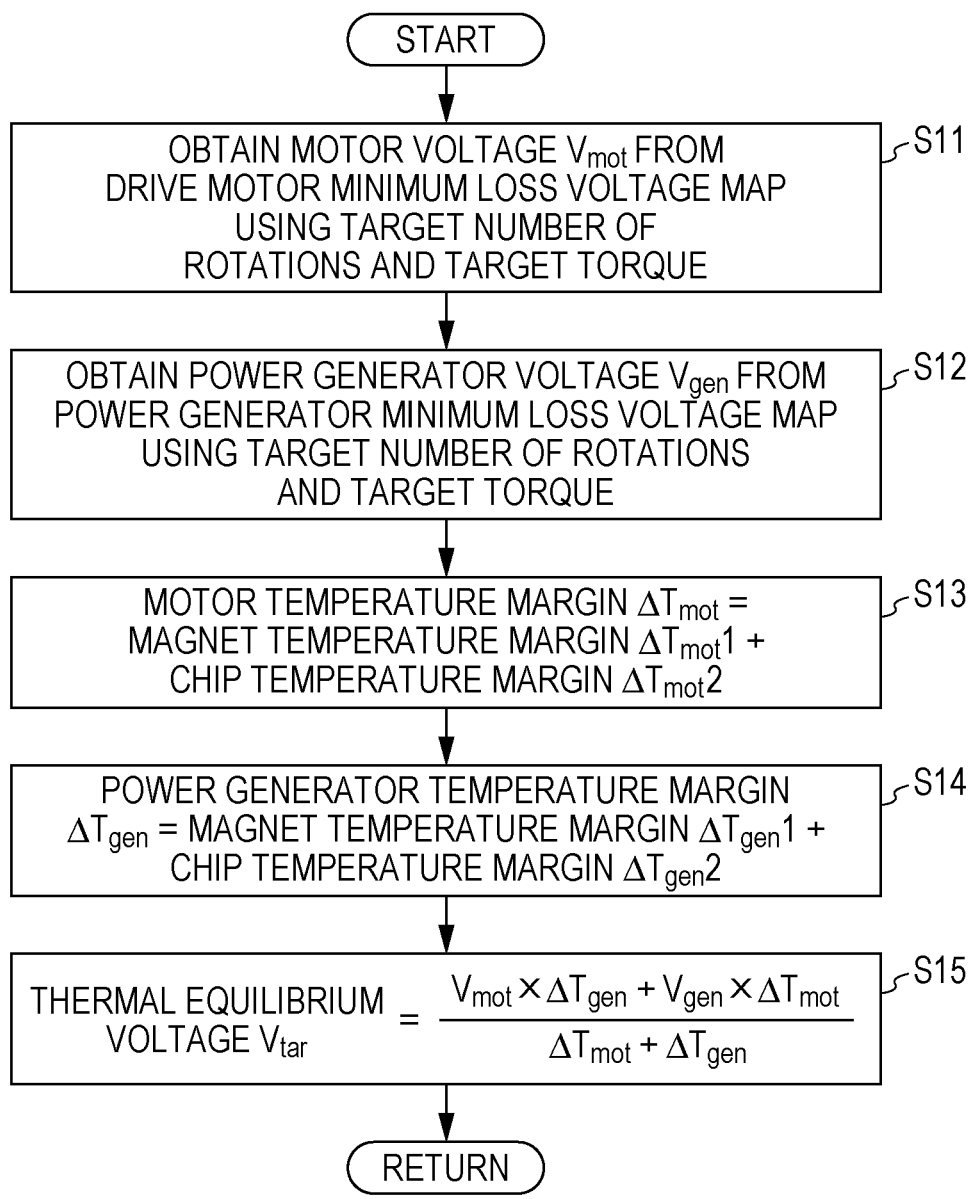
FIG. 6 is a flowchart illustrating an exemplary operation of the rotating electrical machine control apparatus according to the exemplary embodiment.

The computation process of the thermal equilibrium voltage Vtar performed in step S03 is described below. As illustrated in FIG. 6, in step S11, the drive motor minimum loss voltage map is referenced, and the power supply voltage (the minimum loss voltage) corresponding to the target number of rotations and the target torque of the drive motor 11 is obtained. The obtained minimum loss voltage is used as the motor voltage Vmot for the drive motor 11.

Subsequently, in step S12, the power generator minimum loss voltage map is referenced, and the power supply voltage (the minimum loss voltage) corresponding to the target number of rotations and the target torque of the power generation motor 13 is obtained. The obtained minimum loss voltage is used as the power generator voltage Vgen for the power generation motor 13.

In step S13, the temperature of the chip of the first PDU 14, such as a PWM inverter, and the temperature of the permanent magnet of the drive motor 11 are detected. Thereafter, a difference between the predetermined protection temperature and the temperature of the permanent magnet of the drive motor 11 is used as the magnet temperature margin $\Delta Tmot1$. A difference between the predetermined protection temperature and the temperature of the chip of the first PDU 14 is used as the chip temperature margin $\Delta Tmot2$. In addition, the sum of the magnet temperature margin $\Delta Tmot1$ and the chip temperature margin $\Delta Tmot2$ is used as the motor temperature margin $\Delta Tmot$.

In step S14, the temperature of the chip of the second PDU 15, such as a PWM inverter, and the temperature of the permanent magnet of the power generation motor 13 are detected. Thereafter, a difference between the predetermined protection temperature and the temperature of the permanent magnet of the power generation motor 13 is used as the magnet temperature margin $\Delta Tgen1$. A difference between the predetermined protection temperature and the temperature of the chip of the second PDU 15 is used as the chip temperature margin $\Delta Tgen2$. In addition, the sum of the magnet temperature margin $\Delta Tgen1$ and the chip temperature margin $\Delta Tgen2$ is used as the power generator temperature margin $\Delta Tgen$.

In step S15, the thermal equilibrium voltage Vtar is computed from the above-described equation (1). Thereafter, the processing proceeds to "RETURN".

As described above, in the rotating electrical machine control apparatus 10 according to the present exemplary embodiment, the motors 11 and 13 and the PDUs 14 and 15 are controlled so as to be in thermal equilibrium. Accordingly, an overheating condition of each of the motors and each of the PDUs can be prevented. In addition, the operation can be flexibly performed with minimum limitation, as compared with the case in which the target voltage V is set in consideration of only one of the motors 11 and 13 or only one of the PDUs 14 and 15.

In addition, the thermal equilibrium voltage Vtar can be optimally computed from the above-described equation (1). Furthermore, the total operating loss of the motors 11 and 13 and the PDUs 14 and 15 can be optimally reduced.

Note that in the above-described exemplary embodiment, the motors 11 and 13 may have the same operating characteristic. If the motors 11 and 13 have the same operating characteristic, a minimum loss voltage is computed for only one of the motors 11 and 13, and the thermal equilibrium voltage Vtar to be obtained when the motors 11 and 13 and the PDUs 14 and 15 are in thermal equilibrium is computed using the minimum loss voltage. In such a case, even when a different motor is used for the computation of the minimum loss voltage, the same total operating loss of the motors 11 and 13 and the PDUs 14 and 15 can be obtained. Accordingly, the processing load required when the target voltage V is set can be reduced.

While the above embodiment has been described with reference to the main control unit 27 that defines the minimum loss voltages of the motors 11 and 13 as the motor voltage Vmot and the power generator voltage Vgen, respectively, the embodiment is not limited thereto. For example, the main control unit 27 may set the motor voltage Vmot and the power generator voltage Vgen on the basis of control in which the field weakening currents for the motors 11 and 13 are minimized (i.e., maximum voltage vector control).

In addition, while the above embodiment has been described with reference to the temperature determination unit 25 that defines the sum of the magnet temperature margin $\Delta Tmot1$ and the chip temperature margin $\Delta Tmot2$ as the motor temperature margin $\Delta Tmot$, the temperature of a coil may be further added to the motor temperature margin $\Delta Tmot$. While the above embodiment has been described with reference to the temperature determination unit 25 that defines the sum of the magnet temperature margin $\Delta Tgen1$ and the chip temperature margin $\Delta Tgen2$ as the power generator temperature margin $\Delta Tgen$, the temperature of a coil may be further added to the power generator temperature margin ΔTgen. In this way, the effect of the field weakening current in accordance with a change in the voltage can be taken into account.

In addition, while the above embodiment has been described with reference to the main control unit 27 that uses the thermal equilibrium voltage Vtar as the target voltage V, the embodiment is not limited thereto. For example, one of a motor voltage Vm and a power generator voltage Vg that can be obtained through an appropriate process and the thermal equilibrium voltage Vtar may be selected as the target voltage V as needed.

Figure 7:
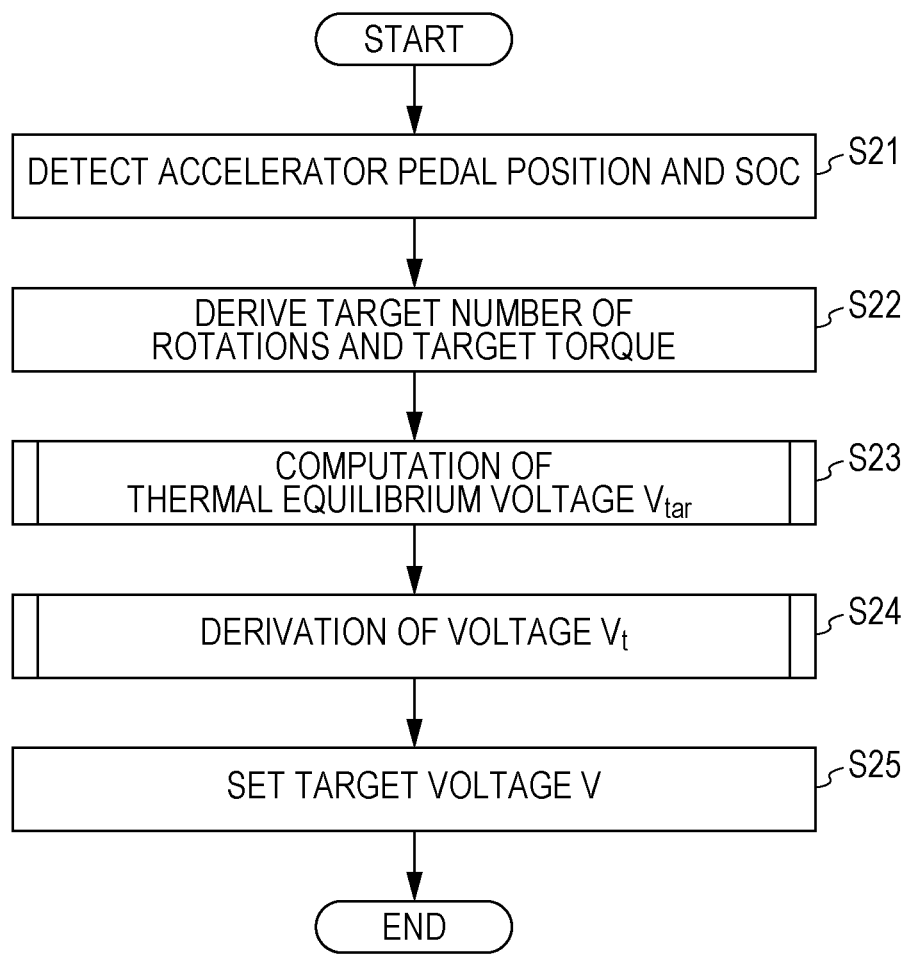
FIG. 7 is a flowchart illustrating an exemplary operation of a rotating electrical machine control apparatus according to a modification of the exemplary embodiment.

In the operation performed by the rotating electrical machine control apparatus 10 of this modification, for example, the accelerator pedal position and the amount of charge remaining in the battery 17 (the SOC) are detected in step S21 illustrated in FIG. 7 first. Subsequently, in step S22, the target number of rotations and the target torque are computed for each of the motors 11 and 13. Thereafter, in step S23, the processes of the above-described steps S11 to S15 are performed and, therefore, the thermal equilibrium voltage Vtar is computed. In step S24, a computation process of a voltage Vt (described below) is performed. Subsequently, in step S25, one of the voltage Vt and the thermal equilibrium voltage Vtar is selected as needed. In this way, the target voltage V is set. Thereafter, the processing proceeds to "END".

Note that in step S25, even when, for example, the voltage Vt is set as the target voltage V, the temperature of each of the motors 11 and 13 and the PDUs 14 and 15 may become less than or equal to a predetermined protection temperature. In such a case, the voltage Vt can be preferentially selected as the target voltage V. In contrast, if the voltage Vt is set as the target voltage V, the temperature of any one of the motors 11 and 13 and the PDUs 14 and 15 may become higher than the predetermined protection temperature. In such a case, the thermal equilibrium voltage Vtar can be selected as the target voltage V.

The computation process of the voltage Vt performed in step S24 is described below. As illustrated in FIG. 8, in step S31, a power supply voltage is computed through a predetermined computation process using the target number of rotations and the target torque for the drive motor 11 (i.e., the voltage of the first PDU 14 on the DC side is computed). The result of computation is defined as the motor voltage Vm. Subsequently, in step S32, a power supply voltage is computed through a predetermined computation process using the target number of rotations and the target torque for the power generation motor 13 (i.e., the voltage of the second PDU 15 on the DC side is computed). The result of computation is defined as the power generator voltage Vg. In step S33, one of the motor voltage Vm and the power generator voltage Vg (e.g., a greater one) is selected. The selected one is defined as the voltage Vt. Thereafter, the processing proceeds to "RETURN". Note that the motor voltage Vm and the power generator voltage Vg are power supply voltages obtained through, for example, control in which the minimum loss voltage of each of the motors 11 and 13 is minimized or the field weakening current for each of the motors 11 and 13 is minimized (i.e., maximum voltage vector control).

Note that in the above-described embodiment, instead of the drive motor 11 and the power generation motor 13, the rotating electrical machine control apparatus 10 may include a plurality of rotating electrical machines having different imposed loads and a plurality of power drive units (PDUs) that perform power supply control on the rotating electrical machines and set a target voltage using a thermal equilibrium voltage obtained when these units are in thermal equilibrium.

In addition, in the above-described embodiment, the hybrid vehicle 1 is not limited to a series hybrid vehicle. For example, the hybrid vehicle 1 may be a hybrid vehicle having functions of a series type and a parallel type or a hybrid vehicle of a power split type. Furthermore, the rotating electrical machine control apparatus 10 is not limited to a rotating electrical machine control apparatus mounted in the hybrid vehicle 1. For example, the rotating electrical machine control apparatus 10 may be mounted in an electric vehicle including the drive motor (MOT) 11 connected to the drive wheels W.

According to a first aspect of the embodiment, a rotating electrical machine control apparatus includes a plurality of rotating electrical machine control units (e.g., rotating electrical machine control units 41 and 42 in an exemplary embodiment), each including a rotating electrical machine (e.g., a drive motor 11 or a power generation motor 13 in the exemplary embodiment) and a power supply control unit (e.g., a first PDU 14 or a second PDU 15 in the exemplary embodiment) that performs power supply control on the rotating electrical machine, where the rotating electrical machine control units having different imposed loads, and a target voltage setting unit (e.g., an MGECU 18 in the exemplary embodiment) that sets voltages of the rotating electrical machine control units on a DC side to target voltages by using thermal equilibrium voltages that represent the voltages on the DC side and that are obtained when the rotating electrical machine control units are in a thermal equilibrium condition. Since the plurality of rotating electrical machine control units are controlled so as to be in a thermal equilibrium condition, overheating of some of the rotating electrical machine control units can be prevented. In addition, the operation can be flexibly performed with minimum limitation, as compared with the case in which the target voltage is set in consideration of only some of the rotating electrical machine control units.

The target voltage setting unit can compute the thermal equilibrium voltages on the basis of a temperature margin for the thermal equilibrium condition for each of the rotating electrical machine control units. In this way, the thermal equilibrium voltages can be appropriately computed so that overheating of some of the rotating electrical machine control units is prevented.

The rotating electrical machine control apparatus can further include a minimum loss voltage computing unit (e.g., a main control unit 27, step S11, and step S12 in the exemplary embodiment) that computes a minimum loss voltage representing the voltage on the DC side obtained when an operating loss is minimized on the basis of the number of rotations and torque of the rotating electrical machine for each of the rotating electrical machine control units. The target voltage setting unit can compute the thermal equilibrium voltage on the basis of the minimum loss voltage. In this way, the total operating loss of the rotating electrical machine control units can be appropriately reduced.

The plurality of rotating electrical machines can have the same operating characteristic. If the rotating electrical machines have the same operating characteristic, a minimum loss voltage can be computed for only one of the rotating electrical machines, and the thermal equilibrium voltage to be obtained when the rotating electrical machines and the rotating electrical machine control units are in thermal equilibrium can be computed using the minimum loss voltage. In such a case, even when a different rotating electrical machine is used for the computation of the minimum loss voltage, the same total operating loss of the rotating electrical machine control units can be obtained. Accordingly, the processing load required when the target voltage is set can be reduced.

The number of the rotating electrical machine control units can be set to two. The rotating electrical machine of one of the rotating electrical machine control units can be an electric motor, and the rotating electrical machine of the other rotating electrical machine control unit can be a power generator. In this way, even when a vehicle includes an electric motor and a power generator used for different purposes and the output voltage is computed for one of the electric motor and the power generator, the operation can be flexibly performed without excessively restricting one of the outputs of the electric motor and the power generator.

Obviously, numerous modifications and variations of the present invention are possible in light of the above teachings. It is therefore to be understood that within the scope of the appended claims, the invention may be practiced otherwise than as specifically described herein.

What is claimed is:

1. A rotating electrical machine control apparatus comprising:
   a plurality of rotating electrical machine controllers each including a rotating electrical machine and a power supply controller configured to perform power supply control on the rotating electrical machine, the rotating electrical machine controllers having different imposed loads; and
   a target voltage setting device configured to set DC-side voltages of the rotating electrical machine controllers to a target voltage defined as a thermal equilibrium voltage which represents the DC-side voltages obtained when the rotating electrical machine controllers are in a thermal equilibrium condition,
   wherein the target voltage setting device is configured to compute the thermal equilibrium voltage based on a temperature margin of the rotating electrical machine controllers in the thermal equilibrium condition,
   wherein number of the rotating electrical machine controllers is set to two,
   wherein the rotating electrical machine of one of the rotating electrical machine controllers is an electric motor, and
   wherein the rotating electrical machine of another rotating electrical machine controller is a power generator.

2. The rotating electrical machine control apparatus according to claim 1, further comprising:
   a minimum loss voltage computing device configured to compute a minimum loss voltage representing a DC-side voltage obtained when an operating loss is minimized based on number of rotations and torque of the rotating electrical machine for each of the rotating electrical machine controllers,
   wherein the target voltage setting device defines the minimum loss voltage for each of the rotating electrical machine controllers as a voltage for each of the rotating electrical machine controllers, and
   wherein the target voltage setting device is configured to compute the thermal equilibrium voltage based on the voltage and the temperature margin.

3. The rotating electrical machine control apparatus according to claim 1, wherein the rotating electrical machines of the rotating electrical machine controllers have a substantially same operating characteristic.

4. The rotating electrical machine control apparatus according to claim 1, further comprising:
   a temperature detector configured to detect temperatures of the rotating electrical machine controllers,
   wherein the target voltage setting device is configured to compute the thermal equilibrium voltage based on the temperatures detected by the temperature detector.

5. The rotating electrical machine control apparatus according to claim 4, wherein the target voltage setting device is configured to compute the temperature margin based on the temperatures detected by the temperature detector.

* * * * *